United States Patent [19]
Smith et al.

[11] Patent Number: 5,212,770
[45] Date of Patent: May 18, 1993

[54] DATA-HANDLING AND DISPLAY SYSTEM CAPABLE OF SUPPORTING MULTIPLE APPLICATION PROGRAMS AND OUTPUT DEVICES

[75] Inventors: Robert M. Smith, Andover; David M. T. Ting, Sudbury; John Porter, Lexington; Gerald Williams, Tyngsborough, all of Mass.

[73] Assignee: Eastman Kodak Company, Rochester, N.Y.

[21] Appl. No.: 446,975

[22] Filed: Dec. 6, 1989

[51] Int. Cl.⁵ .............................................. G06F 15/20
[52] U.S. Cl. ..................................................... 395/155
[58] Field of Search .................... 395/102, 144–148, 395/155–161, 275

[56] References Cited

U.S. PATENT DOCUMENTS

| | | | |
|---|---|---|---|
| 4,539,653 | 9/1985 | Bartlett et al. | 364/900 |
| 4,713,754 | 12/1987 | Agarwal et al. | 364/200 |
| 4,723,211 | 2/1988 | Barker et al. | 364/300 |
| 4,739,477 | 4/1988 | Barker et al. | 364/300 |
| 4,751,740 | 6/1988 | Wright | 382/1 |
| 5,093,903 | 3/1992 | Sudoh et al. | 395/102 |

Primary Examiner—Heather R. Herndon
Attorney, Agent, or Firm—Mark Z. Dudley

[57] ABSTRACT

An interface system that facilitates user interaction with a plurality of document-management programs, each of which may require different data formats, and convenient output of data generated by such programs to recording or display devices. The invention includes a "front end", which accepts user commands and channels them to a designated application program; and a "back end", which converts output data into a form compatible with a selected output device or display, and which can simultaneously drive display of data from a plurality of application programs. The system operates using a common set of raster-image instructions; output and display data from an application program are converted into this common set of instructions before being provided to a selected output or display device. The system can store multiple display lists in segregated memory partitions, and then combine the lists according to a user-defined "mapping" procedure to produce a single, integrated display.

59 Claims, 4 Drawing Sheets

DATA-HANDLING AND DISPLAY SYSTEM CAPABLE OF SUPPORTING MULTIPLE APPLICATION PROGRAMS AND OUTPUT DEVICES

I. BACKGROUND OF THE INVENTION

A. Field of the Invention

The invention relates to the field of computer-based document production, and in particular to a system for receiving, modifying and transmitting documents to output devices.

B. Description of the Related Art

Complex information management systems, such as that described in allowed application Ser. No. 07/446,937, filed contemporaneously herewith and incorporated by reference herein, may operate on several distinct data types. These can include encodings for text, geometric abstracts (graphics), and scanned or bitmapped images. Each data type must be stored, accessed, manipulated and displayed according to rules that differ from those governing the other data types. Furthermore, a number of different representation and encoding formats are available for each data type; these include ASCII and EBCDIC coding for text, ITF units for type, GKS metafile for computer-aided design (CAD) graphics, Group IV CCITT code for scanned lineart, Postscript files (Postscript is produced and sold by Adobe Systems, Inc.), MacDraw files (MacDraw is produced and sold by Apple Computer, Inc.) and Eikonix image formats (produced and sold by Eastman Kodak Company), among others. Text can reside in system memory along with compositional attributes (e.g. typeface, size, position, color) embedded therein, or as generic (e.g. pure ASCII or EBCDIC) character strings. The divergent generic rules and specific formats relating to encoded data present significant input/output difficulties.

Document production systems typically contain (or, in the case of simple word processing systems, are built around) editing functions that allow the user to add, modify or delete text prior to final output. An editing facility (often referred to as an "application program" due to the multiplicity of possible editing tasks) must accept user input and operate on the particular data type(s) and encoding format(s) for which it is configured. Often, users of current document management systems sequentially call a series of appropriate editors to modify a particular block of data.

After input and editing have been completed, the data representing a document is sent to one or more output devices, such as a printer, image setter, or the interactive terminal on which editing takes place. Output devices differ in display mode, resolution, functionality, command syntax, data encoding and other operational constraints. Current document management systems must be tailored to the particular output devices employed, or external output software modules purchased and installed.

II. DESCRIPTION OF THE INVENTION

A. Objects of the Invention

Accordingly, it is an object of the present invention to translate encoded data into a common description applicable to text, graphics and image data types.

It is a further object of the invention to enable editing of a variety of data types and encoding formats using a single output facility capable of supporting multiple editors.

It is another object of the invention to facilitate transparent flow of data to a variety of output devices from a single input-output system.

It is yet a further object of the invention to provide a flexible, hierarchical representation schema that facilitates manipulation of complex arrangements of text, graphic and image data.

B. Summary of the Invention

To facilitate the foregoing, the input-output system of the present invention offers an integrated data-handling and storage package that may be used in conjunction with multiple editors and multiple output devices. Straightforward interface with different editors or other application programs is facilitated by a limited set of protocols that control communication with the invention, and a standard set of instructions. Application programs are configured to provide the necessary commands that will drive the input-output system. In essence, a standard mode of data representation mediates between multiple application programs and output devices.

Merging of different data types within a single document is performed by the inventive input/output system itself, rather than by one or more editors, in order to avoid limitations inherent in the latter. The system accepts data encodings in a number of different formats, decodes them into a standard format, and applies any user-specified layout parameters to create an output document. An array of translation routines contained within the system enables use of a variety of output devices therewith.

The input/output system of the present invention operates on a document that has already been paginated, in the sense that system memory contains a set of data that are somehow directed to specific areas of a physical page. Encoding of pagination attributes may be achieved in a number of ways, such as assembly of data into sequential memory addresses, the use of pointers, or other means well known in the art.

The input/output system decodes the data into a single, common raster-image processing (RIP) instruction set which can be used to drive the screen display and serve as a uniform description that may be translated to drive output devices. This internal instruction set lies at the heart of the invention, and serves a mediating function both between various data encoding formats and as a set of output primitives easily translated into specific output device commands.

An application program accesses a document through the input-output system, which sets up a "virtual display" in response to a request from the application program. It is through the virtual display that the application program communicates with the input-output system. Conceptually, the virtual display defines a two-dimensional display surface containing the document or portions thereof requested by the application program, expressed in the internal format. Ordinarily, the input-output system implements the changes requested by the application program on the virtual display, performing the necessary real-time decoding of data provided by the application program into the internal format by means of direct memory reference, procedural calls, and/or table lookup routines embedded therein. It is also possible for the application program to enter new instructions directly into the display list, or to call an embedded procedure that creates a data display object and places it within the data display list. In both of these cases, the output instructions will be encoded in the internal format. The input-output system itself performs operations relating to merging of text, graphic and image components on the virtual display.

Application programs name, open, close and define virtual displays with respect to the formatted document. Storage mode, dimensions, precision (number of bits per pixel), output devices, protection levels and access privileges are also designated. This specification, which remains with the virtual display until it is deleted, informs the input-output system how to interpret the data that the application program will produce.

In order to increase system flexibility and to support certain operations performed directly by the input-output system, access to the virtual display proceeds through three additional system layers. The first are "windows", which define bounded rectangular areas of arbitrary orientation and position within a virtual display. The next level consists of "viewports"; these constructs define bounded rectangular areas of arbitrary orientation within a window, and contain the portion of the document actually viewed by the user. Although the user may interact only with a single viewport at any one time, more than one viewport may be displayed on the screen of a terminal by means of the final layer, "virtual terminals." Visually, a virtual terminal is presented to the user as a rectangular portion of the physical display device's screen, with multiple virtual terminals overlapping one another in the order of priority set by the user.

The purpose of introducing windows and viewports is to permit various geometric and logical combinations at a point-by-point level, or "transformations", therebetween. A window may be translated, rotated, cropped and/or scaled with respect to the virtual display to which it relates. By changing the position and/or dimensions of the window with respect to the virtual display, the user may also pan across the virtual display and/or magnify the size of the information defined thereby. Viewports may be subjected to the same transformations with respect to a window. This redundancy of operation allows the user to create successively more complex output by combining the contents of multiple transformed windows into a single viewport, which may itself be transformed. Due to the hierarchical relationship between the virtual display, windows and viewports, multiple transformations would be impossible without the ability to independently manipulate both viewports and windows.

Rotation, translation, cropping and anamorphic scaling algorithms operate in a linear fashion, and are therefore readily applied to graphic and image data. However, text characters and the space between them do not scale linearly. In applying these geometric operations to text, the input-output system makes use of standard composition algorithms that have been developed for non-linear character scaling.

Combination functions perform arithmetic and boolean operations between the contents of two or more windows with the result entered into a viewport. These permit various portions of the document to be overlaid with respect to one another.

The application program communicates with all levels of the input-output system, from virtual display to virtual terminal, but can actually write data only to a viewport. As new data is entered by the application program, and with the completion of each specified transformation between a window or windows and a viewport, the results are displayed as required by the appropriate window-to-viewport mappings.

When all such transformations have been completed, preparation for output begins. The input/output system contains a bank of translation programs to convert the device-independent internal instructions into code that is meaningful to the particular output device requested by the application.

C. BRIEF DESCRIPTION OF THE DRAWINGS

The foregoing and other and further objects of the invention will be understood more readily from the following detailed description of the invention, when taken in conjunction with the accompanying drawings, in which:

FIG. 1 depicts the functional organization of an input/output system embodied in accordance with the present invention.

FIG. 2 exemplifies the relationship between windows and viewports, and transformations therebetween.

D. DETAILED DESCRIPTION OF THE INVENTION

1. System Components

Figure 1:
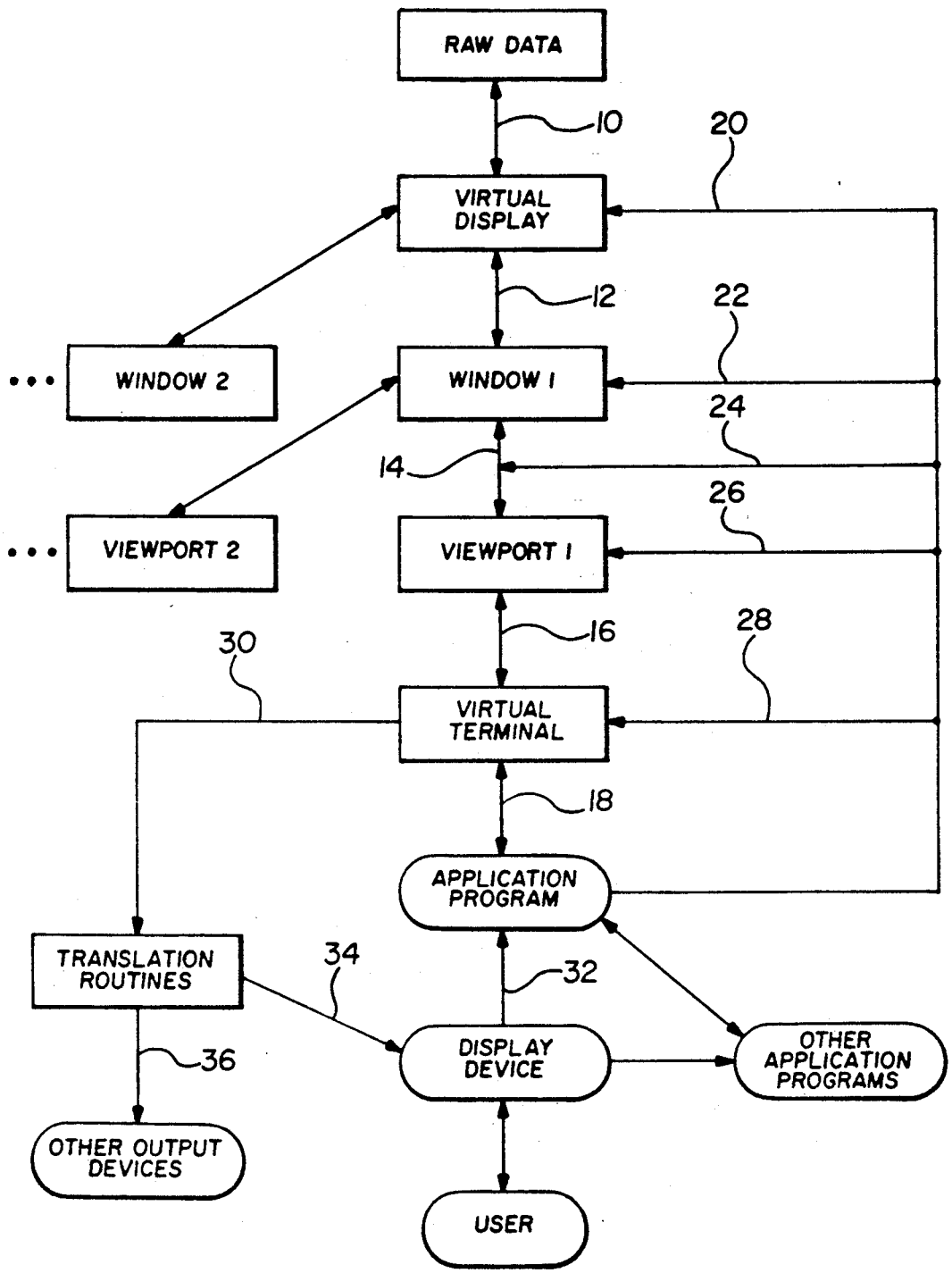

FIG. 1 schematically illustrates the major components of an input/output system embodying the invention and the relationship among such components. The downward arrow of pathway 10 represents transfer of data contained in system memory to the virtual display. This step is initiated by the application program opening and defining the virtual display (pathway 20); the application program then obtains the document from system memory and stores it in an internal memory cache allocated by the input-output system. Upon completion of this transfer, the input-output system commences decoding of the raw data into the internal instruction set. The system components described herein point to or contain only decoded data.

Opening a virtual display requires provision of the following information by the application program, in the form of commands passed to the input-output system:

virtual display name;

access mode: assigns access privileges to the virtual display to prevent inappropriate usage. In accordance with standard techniques of privilege allocation, a particular user (or application program) can be restricted to one or more access modes. In the present embodiment, these are: create, read, modify, delete;

device codes: output devices that will be used in conjunction with the virtual display;

storage mode: preferred means of representing the virtual display—either display list, memory bitmap or display bitmap;

initial values of interior and exterior (border) pixels;

dimensions: maximum X and Y coordinates. These coordinates are related to physical dimensions by a global attribute, which can be changed to accommodate devices of varying resolutions;

pointer to list of windows on this virtual display;

pointer to list of viewports on this virtual display in priority order. This hierarchically ranked list is maintained to permit future reconstruction of the final viewport image.

The foregoing information constitutes a "data structure," or internal representation of the state of the virtual display. In effect, the data structure functions as a placeholder containing a specification for the basic properties of the virtual display. This and other data structures define relationships among virtual terminals, windows and viewports, provide necessary values to the algorithms responsible for performing operations on multiple windows and/or viewports, and also define rendering boundaries. Data structures remain with the associated system component until such component is deleted, and essentially inform the input-output system how to interpret the data that the application program will produce.

In addition to access privileges, each virtual display is provided with a lock that may be set or disabled by the user to support concurrent access by multiple applications. The locking function is a standard facility well-known in the art. Storage mode, dimensions, precision (number of bits per pixel), output devices, protection levels and access privileges are selected by the application program.

The application program terminates access to a virtual display by issuing a "close" command to the input-output system. The contents of the virtual display are transitory; complete deletion occurs upon effective communication of the close command (assuming the virtual display has not been locked).

Windows are opened by the application program (pathway 22) after the virtual display has been defined. The content of a window is determined by the portion of the virtual display that it encloses, as defined by the window's data structure. In order to open a window, the application program provides the following information, in the form of commands passed to the input-output system:

Virtual display identifier ("ID"), an index to a table listing memory addresses for virtual display data;
window name;
dimensions: maximum X and Y coordinates. The user may set window size by moving the cursor or a pointing device along portions of the virtual display shown on the screen, or define the size directly in coordinates. Size cannot exceed that of virtual display;
position: X and Y coordinates of one corner of window rectangle;
angular orientation with respect to virtual display (default is parallel to axis of virtual display).

These values complete the data structure for the window. If the parameters provided to the input-output system by the application program are acceptable, the input-output system returns a unique numerical ID that provides the basis for subsequent references.

Once a window is opened, its attributes—position, orientation, and dimensions—can be changed by the application program. New attribute information can be provided in terms of absolute coordinates and values, or specified as differential values with respect to the present set of attributes.

Viewports are also opened by the application program (pathway 26) after the virtual display has been defined. The content of a viewport consists of rendering instructions for data representing the portion of the virtual display that the viewport encloses (including data written by the user into the viewport), and commands representing the results of window-to-viewport mappings (discussed below). Only the viewport actually contains displayable instructions; the other system components clip the display list according to the specified coordinate dimensions and output device resolution, thereby effectively enclosing the portion of the document residing therein.

In order to open a viewport, the application program provides the following information, in the form of commands passed to the input-output system:
virtual display ID;
window ID;
viewport name;
dimensions: maximum X and Y coordinates. Size cannot exceed that of virtual display;
position: X and Y coordinates of one corner of viewport rectangle;
angular orientation with respect to virtual display
priority: within a window, viewports with higher priority occlude those with lower priority.

These values complete the data structure for the viewport. If the parameters provided to the input-output system by the application program are acceptable, the input-output system returns a unique numerical ID that provides the basis for subsequent references. Once a viewport is opened, its attributes—position, orientation and dimensions—can be changed interactively, in a manner similar to that described above with respect to windows.

In addition to the foregoing specification data, it is useful to include a pointer to a description of the exposed portions of the viewport. This pointer helps to minimize wasted display resources by insuring that only those instructions relating to exposed portions will be rendered.

Because viewports are also accorded a unique priority value determined by the temporal order in which they are opened, pointers to the viewports hierarchically located immediately above and below are useful as well. When multiple viewports are output to the same virtual terminal, a viewport with a higher priority will occlude one with a lower priority. This permits applications to shuffle viewports in the same manner as pieces of film or images. The hierarchical pointers facilitate recreation of the final image from those contained in the component viewports.

Figure 4:
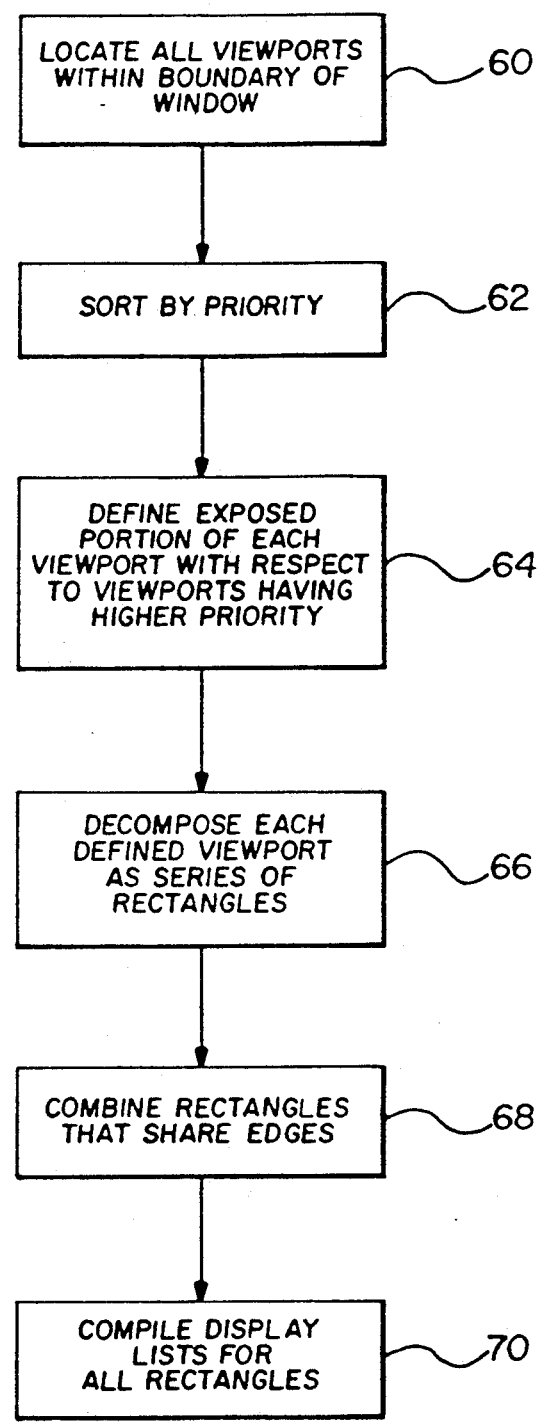
FIG. 4 is a flowchart setting forth the steps for creating a final image from a plurality of hierarchically related viewports.

The flowchart depicted in FIG. 4 illustrates the manner in which multiple, hierarchically organized viewports are resolved into a single image on a virtual terminal. In the first step, denoted by reference numeral 60, all viewports containing data within a single window are identified. Second step 62 consists of organizing the display lists associated with each viewport in terms of the priority value associated therewith. I third step 64, positional coordinates commonly occupied by parts of the display lists of more than one viewport are resolved in favor of the viewport with highest priority. This is accomplished by sequential comparisons of viewport dimensions, position and angular orientation with those of viewports having higher priority, followed by clipping of the common portions in the display list of the lower-priority viewport. The unclipped portions of each viewport are resolved into a series of rectangles by a standard geometric analysis algorithm in fourth step 66, and the display lists of rectangles sharing an edge are combined in fifth step 68. The overall display list for the entire display image, containing appropriately occluded and exposed portions of all viewports, is compiled by unifying all of the various rectangle combinations in sixth step 70.

Application programs can directly modify only data residing in the portion of the virtual display enclosed by the viewport, using a write-to-viewport command. Data lying within this portion is copied into a buffer physically located in system memory when the viewport is first defined. Positions in the buffer are defined relative to the origin of the viewport. Commands to modify viewport attributes are executed by altering values of the viewport data structure. Characteristics of windows may be similarly modified by the user, although the data residing in a window are accessible only through a viewport. The write-to-viewport command is likewise executed such that new data (encoded in the internal instructions) is entered at the position within the buffer specified as part of the command.

Several parameters are passed to the viewport along with the write-to-viewport command. The first is the "update mode," which specifies whether viewport modifications will be entered into the virtual display immediately or on a batch basis. Entry into the virtual display propagates along the upward arrows of pathways 14 and 12.

The "write mode" specifies how new data will interact with the existing data in the viewport. Available modes include opaque, transparent and user-specified. Opaque mode overwrites existing data (if any) with the new data. Transparent mode attenuates the intensity of any data overwritten by the new data. User-specified mode allows the application to employ arithmetic or logical operations to determine the effect of new data entering buffer positions occupied by existing data.

The other parameters necessary to enable the write-to-viewport command are the viewport ID and the coordinate position within the viewport where writing is to commence. This position can be represented on an output device by a cursor or similar tracking symbol, thereby permitting the user to visually specify the appropriate coordinate location. The application program is responsible for associating the on-screen, page coordinate location of the tracking symbol with the corresponding display list position. Alternatively, albeit somewhat less efficiently, the user's modifications can simply be added to the end of the display list as additional rendering instructions (see, e.g., description of OutputChar instruction, below).

The downward arrow of pathway 14 represents window-to-viewport mapping, which is initiated and controlled by the application program (pathway 24). Window-to-viewport mapping permits the contents of different windows to be selectively combined and written into a viewport.

Figure 2:
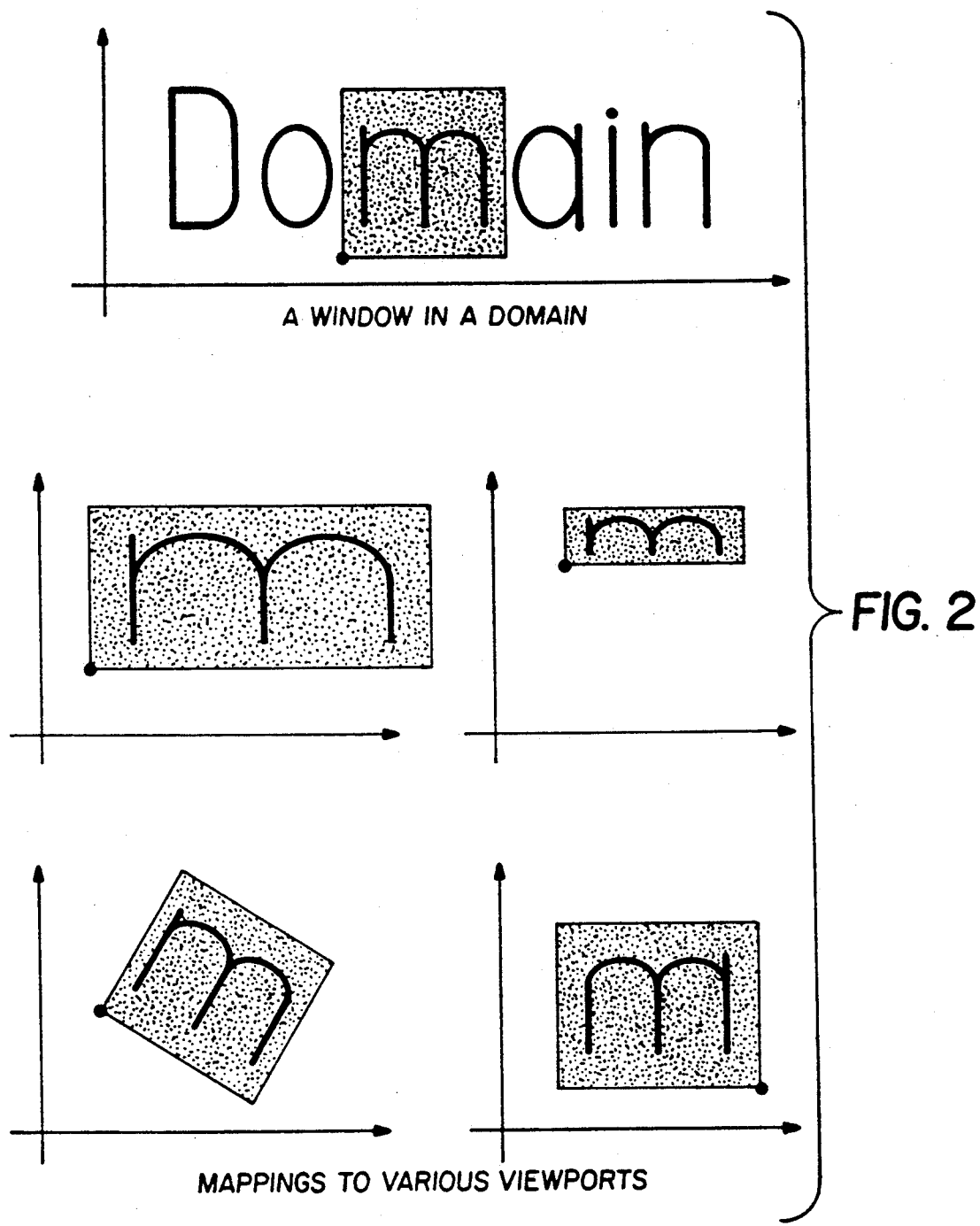

The simplest mapping operation involves direct copying of the contents of a window to a viewport. In this case, the intensity of each point in the viewport is defined as being equal to that of the corresponding point in the window. Slightly more complicated mappings, as depicted in FIG. 2, can include stretching, compression, rotation, reversal, or some combination thereof. These transformations are accomplished by defining the origin, height and width of the target viewport to correspond with those of the window to be mapped thereon, according to equations setting forth the geometric relationship between the viewport and window. These equations are defined as follows.

Let the viewport lie in (u,v) space, with origin (p,q), height dv, width du, and rotation angle r. Similarly, let the window lie in (x,y) space, with origin (h,k), height dy, width dx, and rotation s. Solutions to the equations $$u = Ax + By + C$$

$$v = Dx + Ey + F$$

specify a (u,v) viewport point for each (x,y) window point. Because (1) the window origin must map to the viewport origin and (2) the ends of the window's height and width legs must map to the corresponding corners of the viewport, six equations can be derived for the six unknowns A, B, C, D, E and F:

$$p = Ah + Bk + C$$

$$q = Dh + Ek + F$$

$$p + du(\cos r) = A(h + dx(\cos s)) + B(k + dx(\sin s)) + C$$

$$q + du(\sin r) = D(h + dx(\cos s)) + E(k + dx(\sin s)) + F$$

$$p - dv(\sin r) = A(h - dy(\sin s)) + B(k + dy(\cos s)) + C$$

$$q + dv(\cos r) = D(h - dy(\sin s)) + E(k + dy(\cos s)) + F$$

These equations produce a solution provided that dx and dy are non-zero. A similar set of equations can be derived for the inverse mapping from viewport to window (i.e. from (u,v) space to (x,y) space), and will provide a solution so long as du and dv are non-zero.

Other operations manipulate the contents of two or more windows. Arithmetic operations include addition, subtraction, multiplication, division and functional mapping operations on the intensity of corresponding points between two windows. These combination operations are used primarily in conjunction with color images and graphics, where color values of pixels lying within an area of overlap between two or more images take on desired characteristics based on the operation chosen. For example, using an RGB additive color model, an addition operation on two overlapping pixels adds the bytes specifying the color of each pixel, thereby producing the additive color. Conversely, performing the same addition operation on two pixels using a CMYK subtractive color model produces the subtractive color. Specifying a single arithmetic function that operates on an entire set of overlap points assures visually apparent consistency of color combinations, while providing the user with flexibility in defining the desired operation.

Logical operations include AND, NAND, OR, XOR, NOR and COMPLEMENT (inversion); these set the intensity of each viewport point to the result of a bit-by-bit logical operation on the values of the corresponding window points. Logical operations perform intensity comparisons on corresponding points and generate a true (one) or false (zero) output depending on the result of the individual operation. These functions are used primarily in combining black-and-white images and graphics.

Window-to-viewport mapping begins with a viewport filling procedure, which maps locations within the viewport to corresponding positions within each window pursuant to the equations discussed above. The specified operations are then performed on each point in the windows to determine the value for each point in the viewport. The chunk of data represented by a point depends on the type of data involved. In the case of images, points correspond to individual pixels; in the case of text and graphics, operations are performed on an object-by-object basis. The commands representing mapping operations are added to the display list of the final viewport, thereby facilitating subsequent re-creation of the image from the original, unmodified objects in the constituent windows and/or viewports.

The viewport filling procedure accommodates both magnification and reduction mappings. The degree of scaling is implicit in relative dimensions of the window and target viewport. In the case of reduction, the target viewport will have a smaller set of coordinates, and display data will be lost as the image is mapped to a smaller area. Where a window is magnified, the target viewport will contain a larger number of display points, and display data must therefore be added to fill what would otherwise be empty data points. In either case, production of acceptable final images requires at least some degree of neighborhood analysis to identify points that may be inoffensively discarded or values for new points that must be added. Algorithms performing these functions are well-known in the art.

Window-to-viewport mapping operations are performed in the sequence defined in the display list associated with each viewport. The results of each operation are clipped to the bounds of the viewport and virtual display prior to being entered into the output buffer according to the pointers that define exposed portions of the viewport; truncation of the actual display is accomplished by means of standard clipping procedures. The manner in which the transformed data actually appears in the final viewport depends on the write mode, as discussed more fully below.

Figure 3:
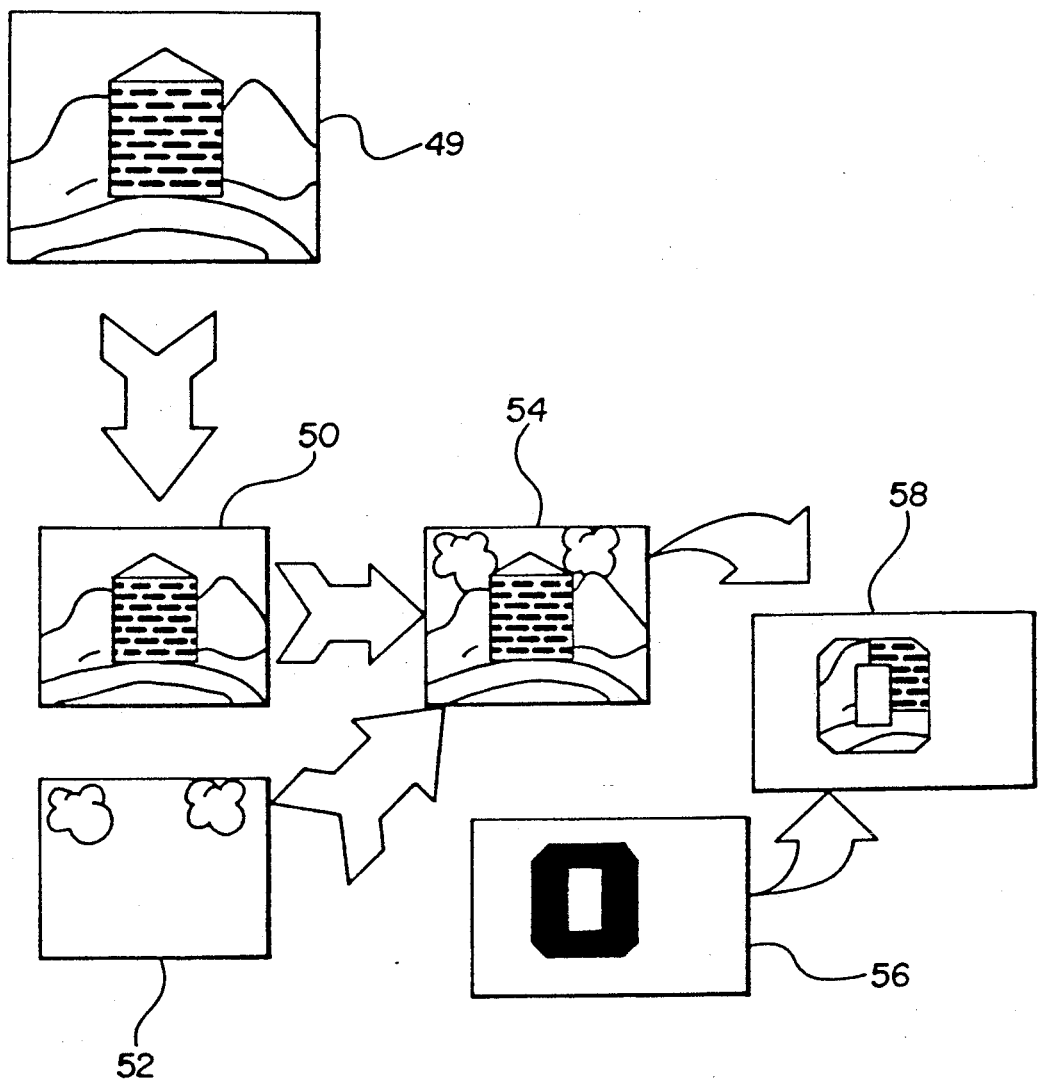
FIG. 3 illustrates the results of successive logical operations on two images to produce a final image.

The command for combining n windows into one viewport requires provision of the following information:
first window ID
second window ID
...
nth window ID
viewport ID
operation
write mode Referring to FIG. 3, there is illustrated a progression of window-to-viewport mappings involving three black-and-white images. The image in window 49 is first reduced by reducing the dimensions of window 49, thereby producing a smaller image in window 50. Windows 50 and 52 are then combined to viewport 54 using a logical OR operation, which results in both images being reproduced and combined on the portion of the current virtual display bounded by viewport 54. Finally, the window associated with viewport 54 is then combined with window 56 to the portion of the current virtual display bounded by final viewport 58, using a logical AND operation. Only where the black text "0" and the landscape are both non-zero will image be reproduced in window 58.

The ultimate sequence of instructions necessary to produce viewport 58 is created as the user specifies successive operations. The following commands (defined below in the section entitled The Internal Instruction Set) render the image in window 49:
StartPage
SetTransform ([Copy])
SetFillPattern ([Bricks])
FillTrajectory ([house specification])
SetFillPattern ([Roof])
FillTrajectory ([Roof])
SetLineWidth ([Specification])
DrawTrajectory ([Road])
DrawTrajectory ([Mountains])
EndPage
The foregoing will be referred to as "Instruction Set I."

The following instructions, added to Instruction Set I, perform the reduction operation necessary to transform window 49 into window 50:
SetTransform ([Specification for reduction])
SetOperator (OR)
Instruction Set I]
EndPage
The foregoing will be referred to as "Instruction Set II."

The cloud image in window 52 is produced with the following commands:
StartPage
SetTransform ([Copy])
SetColor [(Specification])
SetOperator (OR)
SetLineWidth ([Specification])
DrawTrajectory ([Cloud 1])
SetLineWidth ([Specification])
DrawTrajectory ([Cloud 2])
EndPage
The foregoing will be referred to as "Instruction Set III."

The combination of window 50 and window 52 is performed by the following commands:
StartPage
[Instruction Set II]
SetTransform ([Copy])
SetOperator (OR)
[Instruction Set III]
The foregoing will be referred to as "Instruction Set IV."

The mask in window 56 is produced by the following commands:
StartPage
SetColor ([Specification])
SetFont ([Specification])
SetCharSize ([Specification])
OutputChar ([Specification])
Endpage
The foregoing will be referred to as "Instruction Set V."

Finally, the combination of windows 54 and 56 can then be performed by the following operations;
StartPage
SetTransform ([Copy])
Instruction Set IV
SetTransform ([Copy])
SetOperator (AND)
Instruction Set V
EndPage
Thus, the final display list for window 58 is constructed recursively, as the necessary instructions for each specified transformation are successively added to the growing display list.

Communication between the application program and the user occurs across one or more virtual terminals opened by the application. Although application programs interact with each virtual terminal as an independent output device, the contents of more than one virtual terminal can be depicted on a single physical display. This permits the user to selectively designate and interact with a particular application program while visually monitoring alternative options. Only the virtual terminal having the highest priority may be accessed at a particular time; the remaining virtual terminals appear partially occluded by the accessed virtual terminal on the display.

Opening a virtual terminal requires provision of the following information by the application program, in the form of commands passed to the input-output system:

virtual terminal name;
viewport name;
dimensions: maximum X and Y coordinates;
position: X and Y coordinates of one corner of virtual terminal rectangle;
angular orientation with respect to physical display (default is parallel);
identifier of display device
interior value
priority (with respect to other virtual terminals)

In addition to the above specification data, pointers to the virtual terminals hierarchically located immediately above and below are also included to keep track of overlap order. Other useful data include a pointer to a list of viewports displayed on the virtual terminal in order of priority, and a pointer to a description of the exposed portions of the virtual terminal. These latter pointers help to minimize wasted display resources by insuring that only those instructions relating to exposed portions will be rendered.

These values complete the data structure for the virtual terminal. After a virtual terminal has been opened, its position, orientation, size and priority may be dynamically altered by means of commands. Changing the priority of a virtual terminal can result in occlusion of a previously exposed virtual terminal, exposure of a previously occluded virtual terminal, or reordering of the overlap priority of occluded virtual terminals.

After editing tasks have been completed by the user, the input-output system stores the results thereof in system memory (pathway 10). Storage can take two forms. The simplest involves direct storage of the display bitmap, the set of bytes containing all information (including pixel values and device commands) necessary for a particular output device to render the image. Although data stored in this form require no processing by the input-output system as a prerequisite to display, relatively large amounts of memory are required to contain all the necessary information.

Alternatively, the display list can be stored. Because the display list can contain more than one data type (e.g. if the user has combined text with an image), multiple reverse decodings may be necessary. During the course of editing, the users sends data to system memory in the internal format. For data that has been combined using transform operations but which otherwise remains unmodified, the sequence of transformations and the windows and viewports to which they relate will also have been stored as internal instructions. This approach to storage presumes that the contents of the relevant windows and viewports have themselves been stored. The pointers included in the set of viewport attributes provide a map to portions of data lists that describe exposed portions of the viewport, without taking transformations into account.

For example, a viewport might display a rotated graphic image surrounded by text, where the exposed text comprises only a small portion of the document from which it was drawn. The viewport pointers would specify the identities of both the graphic and text files, and the addresses of the first and last characters of the text file displayed in the viewport. These pointers, along with the instructions corresponding to the transformations that produce the final viewport image upon sequential execution, are stored. This form of storage requires the least number of bytes in memory, but demands a relatively large amount of computational resources to render a final image.

Before the application program can communicate with an input device (pathways 30 and 32), the device specifications are provided to the input-output system. The input-output system responds by recognizing the input device, assigning it a numerical device ID and echo mode, and binding the device to a virtual terminal. The ID is a pointer to the data structure specifying the input device. An application program can open multiple devices with different echo modes (such as a track ball, mouse and/or keyboard). Input data is routed to the appropriate application program by tagging the data with the input device ID and matching it to the corresponding application program.

The application program is expected to perform dynamic display operations autonomously. Dynamic operations such as dragging, panning or zooming require the size and position of viewports and windows to be updated constantly. In the case of dragging, the application program associates the X and Y positions of the viewport with corresponding output from the pointing device, and executes a subroutine deriving position movement from the state transition of the pointing device Output device translation (pathways 34 and 36) is performed efficiently by the input-output system by subjecting the data encoded in internal form from the virtual terminal to a staged sequence of decoding operations. The internal instructions have been chosen so as to provide a generalized set of instructions that are easily translated into output device commands, thereby permitting straightforward interface to multiple output devices.

The first step in the translation process is performed by a software module called the "interpreter", which generates a small, concise set of generic output commands from the internal instruction set. The generic output commands are chosen so as to be common to a number of different output devices. These commands are converted to a full set of low-level device driver routines by a second module, called the "interface". Low-level routines are specific to the selected output device. These translation steps are straightforward, and are performed by procedural calls and table lookup. Depending on the number and types of output devices employed by the user, the total number of stored routines can be minimized by selecting only those necessary to accommodate the user's output device set.

The number of device-specific commands that are stored by the input-output system for a particular device depend on the sophistication of operating system relating thereto. If the operating system is primitive, the input-output system performs straight "emulation", reproducing every feature of the internal hardware driver routines (such as making provision for interrupt handling and performing "register poking") necessary to implement each command. More sophisticated operating systems are capable of accepting higher level commands, autonomously managing the details of implementation at the hardware level; for these systems, it is only necessary to convert the output primitives to device-specific encodings by table lookup.

2. The Internal Instruction Set

The internal instruction set consists of a set of general commands, as well as instructions specific to text, graphics and image data. The general device commands are as follows:

StartPage (Width, Height, Base)

The StartPage command begins output and translation of an internally coded instruction command stream that will contain one page of output. The Width and Height arguments define the page boundary, and the Base argument specifies the unit base relating page coordinates to physical measurement units. By specifying coordinate parameters and the relationship of such parameters to physical measurement, this command defines the page coordinate system for a document.

EndPage

The EndPage command indicates that the command stream for the page initiated by the StartPage command has been completely defined. All display pages are delimited by pairs of StartPage and EndPage commands.

General output attribute commands are used to set global (default) attributes for all output primitives for which such attributes are relevant. They are as follows:

EnableClipping (ClipFlag)

The EnableClipping command either enables or disables clipping, depending on the value of ClipFlag. If clipping is enabled, all subsequent output primitives will be clipped to the current set of clipping rectangles. If clipping is disabled, the current clipping boundary is not used, and all subsequent output primitives are clipped to the page limits (defined by the arguments of the last StartPage command).

SetClipBoundary (InteriorFlag, Type, Boundary)

The SetClipBoundary command sets the clipping boundary global attribute, which facilitates clipping of output primitives to a set of non-overlapping output primitives. If clipping is enabled, all subsequent display requests will be clipped prior to display.

The command requires values for three arguments: interior, type and boundary. The interior value is a flag which, when set to ON, defines the interior of the boundary as the portion to be clipped; when set to OFF, everything outside the boundary is clipped. For bitonal boundaries, the foreground is considered to be the interior, and the background is considered to be the exterior.

The type argument permits specifying the clipping boundary as a "trajectory" (see SetTrajectory command, below) or a rectangular bitonal image (see SetFillPattern command, below).

The boundary argument sets forth the actual clip boundary description, specified either as a trajectory or a bitonal image.

EnableTransform (TransformFlag)

The Enabletransform command either enables or disables transformations, depending on the value of TransformFlag. If transformations are enabled, all subsequent output primitives will be transformed using the current transformation attribute. If transformations are disabled, the current transformation is disregarded.

SetTransform (Matrix)

The SetTransform command sets the "current transformation" global attribute. This transformation performs a window-to-viewport mapping in device coordinates. If transformations are enabled, all subsequent display requests will be transformed prior to display. If both transformation and clipping are enabled, display requests are first transformed and then clipped.

The SetTransform command operates on transformation matrices of the form $$u = Ax + By + C$$

$$v = Dx + Ey + F$$

to accept coordinates of the windows to be transformed and those of the target viewport. These values are stored in the Matrix argument.

SetOperator (Operator)

The SetOperator command defines the manner in which an output primitive will interact with earlier-described primitives. Valid operators include logical and arithmetic operators, which function at the pixel level. All subsequent commands will be performed with the specified operator until the next SetOperator command is received. Window-to-viewport mapping is performed by combining this command with the SetTransform command.

SetColorModel (Color_model, Base)

The SetColorModel determines which color model (such as RGB, CMYK, UVL) is to be employed. All subsequent output primitives will be rendered in the specified color index until the next SetColor command is performed. In addition, the Base argument specifies the unit base relating to the selected color model. For example, selection of the RGB model in conjunction with a Base value of 128 divides the available intensity range into 128 levels; the desired magnitude can then be specified by the user.

SetForegroundColor (Color), SetBackgroundColor (Color)

These commands specify the color applied to any output primitive that can be defined by geometry (including text and graphics) and to the background of the page (i.e. portions not covered by any output primitive), respectively. This command does not apply to image data.

SetScreen (Screen_id, Resolution, Ruling, Orientation, Dither)

The SetScreen command specifies selection of a stored halftone screen, which is used to process the current image. Screen_id specifies the chosen screen file, and the other variables direct the manner in which the screen is applied to the image.

EnableScreen

The EnableScreen command directs application of the screen to the current image, using processing routines well-characterized in the art.

SetScreenLimit (Upper[], Lower[])

This command limits the size to which black or white screen dots can grow in order to avoid unwanted white spacing between dots. Dots smaller than the screen limit are not rendered individually, and the portion of the screen containing such dots is considered to be all black or all white.

SetFilPattern (Type, ForegroundFlag, Dimensions, X_res, Y_res, Size, Data)

The SetFillPattern commands sets the "fill pattern" global attribute, which is a two-dimensional pattern stored in CPU memory and deployed in designated bounded fill areas. Patterns may be specified as solid (i.e. solid fill, disregarding any fill patterns) or bitonal, which are periodic in both the X and Y axes.

In the case of bitonal patterns, the pattern information is specified by the arguments foreground, dimensions, x_res, y_res, size and data. These arguments collectively define the width, height, and depth of the pattern, as well providing a pointer to the actual bitmap data. If a null pointer is passed as an argument, subsequent fills will be solid fills of the current color attribute. Otherwise, the color attribute is ignored and the fill pattern is used for fills. All subsequent commands are performed using the specified pattern until the next SetFillPattern command is performed.

The ForegroundFlag identifies foreground data. If the flag is set to ON, all 1 bits in the fill pattern are interpreted as foreground data. If set to OFF, 0 bits are interpreted as foreground data.

The Dimensions argument contains the width and height of the fill pattern, expressed in numbers of pixels.

X-res and Y-res define the horizontal and vertical resolutions, respectively, of the bitonal image, measured in number of pixels per inch.

The Size argument contains the number of bytes of fill pattern data. Odd numbers of bytes are padded at the end with a zero byte.

Data points to the memory address of the fill pattern pixel data, which are presumed stored in scanline order.

SetPatternRegistration (Registration)

SetPatternRegistration specifies whether the filling pattern is locked to the object that is to be filled, or to the output page origin. The origin of the fill pattern is matched to the selected pattern registration point (origin of the object to be filled or origin of the output page). The pattern registration point for geometrically defined output primitives is the first point defining the primitive (i.e. the first point in a "trajectory"). For text, the registration point is the origin of the character box (lower left corner). For graphics, the registration point is the origin in the upper left corner.

SetPatternOffset (Offset)

The SetPatternOffset command sets the pattern offset for the current fill pattern, defined relative to its origin, which permits displacement of the offset pattern with respect to the beginning of the fill area.

SetTrajectory (Interior_rule, Num_elem, Traj_element[])

Trajectories define clipping boundaries and specify paths to be followed in constructing and placing output objects. Trajectories are composed of one or more disconnected elements, the number of which is specified by the variable num_element. This command sets global attributes relating to trajectories, which may be altered for particular segments in DrawTrajectory primitives (discussed below).

An associated interior rule specified by Interior_rule defines the inside of an object, permitting filling algorithms to maintain consistency over the trajectory path. Interior rules are well-characterized in the art, and may be specified by the application program. The interior rule becomes important for filling operations (see FillTrajectory command, below).

The Num_elem variable contains the number of unconnected trajectory elements following immediately in the display list. For example, the two disjoint curves that make up the letter O can be defined as a trajectory of two curved elements.

The Traj_element[] variable contains the list of unconnected trajectory elements. Each trajectory element describes a set of connected vertices (defined with respect to the coordinate frame of the current viewport) and segment geometry between those vertices. A trajectory element contains the number of vertices in the element, the coordinates of the vertices, the geometry of each element segment, and a flag indicating whether the element is an open or closed figure.

Trajectory element geometry data defines the geometric structure of each segment. Permissible structures include straight lines, circular arcs, elliptical arcs or types of spline curves. Because the endpoints of the segments are known, only basic curvature information need be specified as follows:

Circle: circular arcs are defined by specifying the circle center and radius.

Ellipse: elliptical arcs are defined by specifying the ellipse center, the length of the major axis and the length of the minor axis.

Cubic splines: cubic spline curves are defined by the starting and ending parameter values of the curve, the number of elements in the matrix Mb, the values for Mb, the number of control points, and the coordinates for those control points.

Bezier splines: Bezier splines are defined by the starting and ending parameter values of the curve, the number of control points, and the coordinates of the control points.

B splines: B splines are defined by the starting and ending parameter values of the curve, the number of control points, the coordinates of the control points, the number of knot vectors, the knot vector values, and the knot tangents.

I Splines: Interpolating splines are defined by the starting and ending parameter values of the curve, the starting and ending tangents, the number of control points, and the coordinates of the control points.

SetPrecision (Type, Tolerance)

For curve geometries, precision refers to the error approximation to the curve function. The Type variable defines the method of approximation, and can include chord height (wherein the error is represented by the peak difference between the approximation and the actual curve), chord area (wherein the error is represented by the size of the area enclosed by the approximation and the actual curve), chord curvature (wherein the error is represented by the curvature of the chord segment relative to the approximation), or null. Where the value is null, no approximation is performed and the tolerance value is ignored.

The Tolerance variable defines the maximum approximation error that is tolerable; in the present embodiment, Tolerance is specified in hundredths of the unit measure of the page coordinate system currently in use.

In the case of graphics, a set of geometric attribute commands set state variables that affect graphic output primitives. These are:

SetLineStyle (Count, Style[], Dashcap, Style_offset, Dash_offset, Scale_factor)

The SetLineStyle command specifies a one-dimensional run-length pattern that defines a dash pattern along a trajectory, and permits different dot-dash line styles to be defined simply. In the present embodiment, the elements of the dash pattern are specified in hundredths of the unit measure of the page coordinate system currently in use.

The Count variable contains the number of dashes and spaces that define the repeating line style, thereby setting the size of the style data. I the value of this variable is zero, a solid line is produced.

The Style variable contains the list of dash lengths and dash spaces that comprise one period of the repeating style pattern. The first entry is the length of the first dash, followed by the length of the first white space, further followed by the length of the second dash, etc.

The Dashcap variable defines the style of line cap that is to cap the ends of each dash, and can specify any of the line cap styles support for the SetLineCap primitive.

The Style_offset variable specifies an offset into the array of style elements, indicating the first dash or white space length to use in rendering the styled line.

The Dash_offset variable specifies an offset into the first style element specified by Style_offset.

The Scale_factor variable specifies a scaling factor that is applied to a line style, measured in hundredths in the present embodiment. Application of the Scale_factor variable to a line style pattern permits the pattern to be fit to a specific output primitive description.

SetLineWidth (Width_beg, Width_end, Width_ratio)

SetLineWidth establishes the width used in rendering a geometric primitive, may vary linearly from the start to the end of the primitive. Constant width may be obtained by setting equal values for the beginning and end widths.

The variables Width_beg and Width_end specify the line widths at the starting and ending vertices, respectively, of the graphic object.

The variable Width_ratio specifies the percentage of line width allocated to the left side of the line as compared with the right side, relative to the direction in which the line is specified. In the present embodiment, a Width_ratio value of 50 represents a line with width centered on its trajectory; a value of 100 represents a filled line.

SetLineJoint (Line_join)

A joint exists between any two connected trajectory segments. The SetLineJoin command permits the outer edges of joints to be globally specified according to one of the following values:
 mitered joints
 beveled joints
 butt joints
 joints
 flush The input-output system automatically miters the inner edges of joints, but this default may be altered for individual segments by appropriate modification to the specification of segment geometry in the DrawTrajectory instruction for such segments. SetLineCap (Line cap) All open trajectory elements can be capped on both ends, with the style of the cap specified by the SetLineCap command.
 butt end caps
 round end caps
 square end caps Output primitives are the internal data specifications for text, graphic and image data. Data encoded in different formats are decoded to the internal output primitives, with attributes specified in the manner described above; this information collectively serves as a precursor to output driver routines. The following graphics output primitives are utilized:

DrawTrajectory (Seg_mode, Trajectory, Segment_attr[][])

Trajectories are used to define irregular graphic output objects, and are composed of trajectory segments and attributes (which describe what those segments look like).

The values of a trajectory may be explicitly described, or allowed to default to global values set by the SetTrajectory command. The Seg_mode variable indicates whether the globally set trajectory information or newly specified information should be used for rendering. If Seg_mode is set to immediate mode, the information is expected to follow immediately in the command stream.

The Trajectory variable denotes the geometric structure of the trajectory to be drawn, and may take any of the forms applicable to the SetTrajectory command.

In immediate mode, a number of imaging parameters in addition to those specified in the global trajectory attribute may be set within the Segment_attr argument. These are:
 Color of the segment (same arguments as the SetForegroundColor command).
 Width structure of the segment (same arguments as the SetLineWidth and SetWidthRatio commands).
 Pattern: fill pattern, pattern registration, pattern offset and pattern scale of the segment (as specified by the SetFillPattern, SetPatternRegistration and SetPatternOffset commands).
 Line Style of the segment (same arguments as the SetLineStyle command).
 Joint if the segment is followed by another segment.
 The Joint parameter itself consists of a set of attributes:
 Color of the joint, which may be the color of the previous segment, the color of the following segment, or split with half the color of the joint contributed from both connecting segments.
 Pattern within the joint
 Left and right edge types and geometries of the joint. The joint type may be specified as mitered, beveled, rounded (circular arc), flushed or defined by a spline function. Supporting geometrical data must be provided for the type chosen. For beveled joints, the amount of beveling is specified; for mitered joints, the miter limit; for circular joints, the circle center and radius; for spline joints, the start and end parameters of the curve, the number of control points and the control point coordinates (two of the control points lie on the boundary of the segments themselves, one on each segment boundary).

DrawCircle (Center, Radius, Theta_start, Theta_end)

The DrawCircle primitive directs drawing of circular figures. In the present embodiment, the basic circle is specified by a center (corresponding to a point on the page) and radius; an arc defines the portion of the circle to be rendered. This arc is identified by Theta start and Theta_end, which specify angles measured from the X-axis of the page, and enclose the portion of the circle to be rendered.

DrawEllipse (Center, Major, Minor, Gamma, Theta_start, Theta_end)

The DrawEllipse primitive directs drawing of elliptical figures. In the present embodiment, the basic ellipse is specified by the variables Center, Major and Minor, which respectively denote the center of the ellipse on the page, the length of the major axis and the length of the minor axis. The angle Gamma designates the degree of rotation of the ellipse with respect to the X-axis. Theta_start and Theta_end identify the portion of the ellipse to be rendered.

FillQuad (Point1, Point2, Point3, Point4)

The FillQuad primitive fills, using the current fill pattern attribute, arbitrarily oriented quadrilaterals specified by the four arguments, which are treated as connected sequentially.

FillLinkedTraps (Num_traps, Top, Bot[]

The FillLinkedTraps primitive fills a series of unrotated trapezoids. The trapezoids are parallel to the X-axis and share parallel sides, top to bottom. The Num_traps variable specifies the number of trapezoids to be filled. The Top variable defines the top segment of the first (topmost) trapezoid by its leftmost position and length. The Bot variable contains a sequence of leftmost position/length pairs, each of which specify the bottoms of the stacked trapezoids. The number of pairs is equal to Num_traps.

FillLinkedCurvezoids (Num_zoids, Top, Bot[], Left[], Right[])

Curvezoids are geometric shapes described in copending application Ser. No. 07/343,913. The FillLinkedCurvezoids primitive fills a series of curvezoids arranged in the same fashion as the trapezoids filled by FillLinkedTraps. The Num_zoids variable specifies the number of curvezoids to be filled. The Top variable defines the top segment of the first (topmost) curvezoid by its leftmost position and length. The Bot variable contains a sequence of leftmost position/length pairs, each of which specify the bottoms of the stacked curvezoids. The number of pairs is equal to Num_zoids. The Left and Right variables each specify a series of left and right curvezoid sides, with each side defined by a center point and circle radius.

FillTrajectory (Seg_mode, Trajectory, Attributes[][])

The FillTrajectory primitive fills a trajectory using rendering attributes. Both the trajectory that defines the filling area and the rendering attributes for filling that area may be defined by parameters of the FillTrajectory primitive, or by the global values associated with SetTrajectory. Each connected trajectory within the set of trajectories is filled according to the interior rule associated therewith. Accordingly, FillTrajectory allows any shape definable by a trajectory to be filled.

Seg_mode specifies whether the global trajectory values or a set of new values following in the command stream should be employed, thereby permitting the attributes of every segment rendered to be fully specified and allowing individual segments to contain unique attributes. Alternatively, the global values may be specified.

The variables Trajectory and Attributes permit entry of the geometric definition of the boundary to be filled and its imaging characteristics, respectively. The parameters associated with these variables are detailed in the DrawTrajectory description above.

FillCircle (Circle, ChordFlag)

The FillCircle primitive fills the outline of circular figures. The circle and designated segments are specified as in the DrawCircle primitive, above. The "pie slices" specified by Theta start and Theta end may be further subdivided into "chord slices", in which the pie slice is clipped to a triangle by the chord of the defined arc. Chord slices are chosen by setting the ChordFlag to ON, in which case the area rendered is that enclosed by line segments connecting the center point to the perimeter points defined by Theta_start and Theta_end.

FillEllipse (Ellipse, ChordFlag)

The FillEllipse primitive fills the outline of elliptical figures. The ellipse and designated segments are specified as in the DrawEllipse primitive above. Chord slices can also be specified, in the manner described in the FillCircle primitive, above.

The input-output system provides two image attributes, as follows:

SetIntensityMap (ID)

The SetIntensityMap command selects a predefined set intensity map by its identification (ID). The intensity map facilitates color correction of an image by compensating for output device characteristics prior to actual output.

EnableIntensityMap

EnableIntensityMap is a flag that enables or disables use of the current intensity map.

The input-output system provides two image primitives, as follows:

CopyImage (Src, Dest)

The CopyImage primitive copies raster data from a convex quadrilateral source to a convex quadrilateral destination (e.g. a window to a viewport). If transformations are enabled, the data is transformed.

The Src variable identifies the source raster by four sequentially connected points. Raster data within the quadrilateral is copied into the area defined by Dest, which is likewise specified by four sequentially connected points.

OutputImage (Mode, Image_id, Subsection, Position, Image_size, Image[])

The OutputImage primitive renders an image identified by an ID or specified by actual rendering data immediately following in the command stream, placing the image on the page at a specified location. If the image data is to follow immediately, the Image_size parameter specifies the size in bytes of this data.

The Mode variable determines whether the image data is stored, in which case the access ID will follow as the variable Image_id, or will immediately follow. In the latter case, the Image size variable specifies the size in bytes of the image data; the data itself is stored in the variable Image.

The Subsection variable defines an orthogonal rectangular region of the image and its position with respect to the image origin (the upper left corner of the image). The Position variable locates the position on the viewport where the image origin is to be placed.

The input-output system provides the following text attributes:

SetFont (Font_id)

The SetFont command identifies the font that will be used by all subsequent text output primitives until the next SetFont command is received. The Font id variable contains the ID of the desired font, which is stored in system memory.

SetAlternateFont (Font_id, Altfont_id)

The SetAlternateFont command specifies an alternative font (Altfont_id) if the font identified by the SetFont command (Font_id) is not available to the output device.

SetCharSize (ModeFlag, Height, Width)

Setting character size is accomplished by setting the ppointsize and setsize of the characters. The state of the ModeFlag specifies the coordinate system that governs measurement of character size, which can be either page units or output device points. In the former case, character size is specified in hundredths of a page unit; in the latter case, in hundredths of an output device point. The Height argument specifies the "em height" (the size of a capital letter "M") of the character, which is equivalent to pointsize. The Width argument specifies the "em width," which is equivalent to setsize.

SetCharOblique (Oblique_angle)

The SetCharOblique command sets the angular disposition of text relative to the baseline. In the present embodiment, the Oblique_angle variable specifies counter-clockwise rotation from the normal to the baseline, in hundredths of a degree.

SetCharOrientation (Angle, ModeFlag)

SetCharOrientation establishes the default character orientation that is considered unrotated, with respect either to the current trajectory or the vertical axis of the coordinate system of the page. The latter choice is dictated by the state of the ModeFlag. In the present embodiment, the orientation angle is specified in hundredths of a degree.

SetCharAlignment (Alignment)

The SetCharAlignment command determines the alignment of successive characters along a trajectory. For example, selecting baseline alignment causes characters to be aligned along their baseline, while center alignment used in conjunction with a vertical trajectory would render a vertical column of characters along the trajectory. The present embodiment offers baseline, left, right, top, bottom and center alignment options, which are implemented by reference to the page coordinate system.

SetCharReflection (X_axisFlag, Y_axisFlag)

Enabling SetCharReflection by setting either associated flag to the ON state results in generation of reflected characters across the specified axis.

SetharExpansion (Factor)

The SetCharExpansion command alters inter-character spacing by a specified factor. Fonts typically specify a fixed spacing value or method of calculating spacing (e.g. by a proportional spacing algorithm); this value is multiplied by the Factor argument to arrive at an adjusted value. For example, a value of 1.05 for factor will increase character spacing relative to that set by the chosen font, while a value of 0.95 may result in character overlap.

SetIntercharSpace (ModeFlag, Delta)

The SetIntercharSpace increases or decreases inter-character spacing by a fixed amount, rather than by a ratio. This amount, specified by the Delta argument, may be measured in page units or output device point; the choice is dependent on the state of the ModeFlag.

The input-output system provides three text primitives:

OutputChar (Position, Char_code)

The OutputChar primitive draws a text character at a specified position. The Position variable is set to the page coordinate where the character is to be rendered. The current pointsize, setsize, obliquing, font and the specified character code are then translated for the output device.

OutputString (Position, Count, String[])

The OutputString primitive draws a text string starting at the specified position according to the character alignment attribute. The number of characters in the text string is specified by the Count variable to differentiate succeeding characters as text or further commands. The String variable contains the character IDs of the characters comprising the string.

OutputTrajectoryString (Offset, Count, String[])

The OutputTrajectoryString primitive draws a string of text characters along the current trajectory. The value of the Offset variable determines the coordinates of the starting point for the first character along the first trajectory element. The number of characters in the text string is specified by the Count variable to differentiate succeeding characters as text or further commands. The String variable contains the character IDs of the characters comprising the string.

As an example of the efficiency that may be achieved utilizing the internal instruction set, the following commands would be sufficient to render a pattern-filled square with rounded corners, where x,y coordinate pairs specify the locations of the eight vertices:
SetFillPattern (<desired pattern information>)
FillTrajectory (Seg_mode=immediate; $x_1,y_1$ $x_2,y_2$ $x_3,y_3$ $x_4,y_4$ $x_5,y_5$ $x_6,y_6$ $x_7,y_7$ $x_8,y_8$; Attributes =line, arc, line, arc, line, arc, line, arc)
The following Postcript commands would be necessary to render the same image:
New path
$x_0y_0$ move to
$x_1y_1$ line to
$x_{c0}y_{c0}$ $angle_1$ $angle_2$ $r_1$ arc
$x_2y_2$ line to
$x_{c1}y_{c1}$ $angle_3$ $angle_4$ $r_2$ arc
$x_3y_3$ line to
$x_{c2}y_{c2}$ $angle_5$ $angle_6$ $r_3$ arc
$x_4y_4$ line to
$x_{c3}y_{c3}$ $angle_7$ $angle_8$ $r_4$ arc close path
fill pattern (<desired pattern information>) fill The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An input/output system for enabling a user to interact with a plurality of application programs implemented on one or more computers, the system comprising:
   a) a system memory;
   b) a user-responsive display device;
   c) interface means for transferring, to a specified application program, data and instructions defined on the display device by a user;
   d) means, operatively coupled to the interface means, for electronically communicating with at least one application program operative on a computer to accept display data generated by each application program;
   e) memory-partitioning means for defining a plurality of data fields within the system memory, said data fields including:
      i. at least one application data buffer for storing display data generated by an application program;
      ii. at least one display buffer for storing a display list consisting of raster-image instructions defining the dimensions, positions, orientation, and contents of a display;
   f) translation means operatively connected to each application data buffer and each display buffer for converting the data in each application data buffer into a common set of raster-image instructions and storing the instructions in a display buffer; and
   g) a display driver operatively coupled to each display buffer and capable of generating a visual image on the display device in response to the raster-image instructions in each display buffer.

2. The system of claim 1 wherein said common set of raster-image instructions is chosen so as to reduce the processing time and/or memory overhead below that necessary for directly converting application display data into a plurality of output device driver command sets.

3. The system of claim 1 wherein said common set of raster-image instructions comprises general output attribute commands that specify characteristics applicable to all instructions associated with said common set of raster-image instructions.

4. The system of claim 3 wherein raster-image instructions specifying the dimensions of a display include page length and clipping boundary.

5. The system of claim 3 where raster-image instructions specifying the contents of a display specify characteristics associated with the appearance of rendered output.

6. The system of claim 5 wherein said appearance characteristics include color and precision of curve function rendition.

7. The system of claim 5 wherein said appearance characteristics include precision of curve function rendition specified by a method of approximation chosen from the set consisting of chord height, chord area and chord curvature.

8. The system of claim 3 wherein the raster-image instructions include attributes relating to fill patterns.

9. The system of claim 3 wherein the raster-image instructions specify characteristics associated with halftone processing of image data.

10. The system of claim 1 wherein said common set of raster-image instructions comprises output attribute commands that specify characteristics applicable to graphic output primitives.

11. The system of claim 10 wherein said graphic attribute commands include specification of dash patterns.

12. The system of claim 10 wherein said graphic attribute commands include specification of line width.

13. The system of claim 10 wherein said graphic attribute commands include specification of line joints.

14. The system of claim 10 wherein said graphic attribute commands include specification of line caps.

15. The system of claim 1 wherein said common set of raster-image instructions includes output primitives that specify elements of graphic data.

16. The system of claim 15 wherein said graphic output primitives include commands that order rendering of curved shapes.

17. The system of claim 16 wherein said curved shapes include circles and ellipses.

18. The system of claim 16 wherein said curved shapes include shapes of arbitrary curvature specified as comprising at least one element consisting of
   a) a set of connected vertices; and
   b) a specification of segment geometry between said vertices.

19. The system of claim 15 wherein said output primitives specify shapes to be filled using a specified fill pattern.

20. The system of claim 19 wherein said shapes comprise quadrilaterals.

21. The system of claim 20 wherein said shapes further comprise trapezoids and curvezoids.

22. The system of claim 19 wherein said shapes comprise circles and ellipses.

23. The system of claim 19 wherein said shapes further comprise shapes of arbitrary curvature specified as comprising at least one element consisting of
   a) a set of connected vertices; and
   b) a specification of segment geometry between said vertices.

24. The system of claim 1 wherein said common set of raster-image instructions comprises output attribute commands that specify characteristics applicable to image output primitives.

25. The system of claim 24 wherein said image output attribute commands include specification of an intensity map.

26. The system of claim 1 wherein said intermediate instruction set includes output primitives that specify elements of image data.

27. The system of claim 26 wherein said image output primitives include copying of raster data from a convex quadrilateral source and transferring said data to a convex quadrilateral destination.

28. The system of claim 27 wherein the raster data from the source is transformed with respect to the destination prior to being transferred thereto.

29. The system of claim 27 wherein the raster data from the source is combined with raster data in the destination according to a specified arithmetic operation.

30. The system of claim 27 wherein the raster data from the source is combined with raster data in the destination according to a specified logical operation.

31. The system of claim 1 wherein said compound set of raster-image instructions comprises output attribute commands that specify characteristics applicable to text output primitives.

32. The system of claim 31 wherein said text output attribute commands include specification of a character font.

33. The system of claim 31 wherein said text output attribute commands include specification of character size.

34. The system of claim 31 wherein said text output attribute commands include specification of the angular disposition of text relative to the baseline thereof.

35. The system of claim 31 wherein said text output attribute commands include specification of character orientation.

36. The system of claim 31 wherein said text output attribute commands include specification of character alignment along a trajectory.

37. The system of claim 31 wherein said text output attribute commands include character reflection along a specified axis.

38. The system of claim 31 wherein said text output attribute commands include alteration of inter-character spacing by a proportional amount.

39. The system of claim 31 wherein said text output attribute commands include alteration of inter-character spacing by a fixed amount.

40. The system of claim 1 wherein said common set of raster-image instructions includes output primitives that specify elements of text data.

41. The system of claim 40 wherein said text output primitives include drawing of a text character at a specified position.

42. The system of claim 40 wherein said text output primitives include drawing of a text string starting at a specified position.

43. The system of claim 40 wherein said text output primitives include drawing of a text string along the contour of a shape of arbitrary curvature specified as comprising at least one element consisting of
 a) a set of connected vertices; and
 b) a specification of segment geometry between said vertices.

44. The system of claim 1 wherein the display buffer comprises discrete segments including:
 a) a virtual display memory segment containing pointers to the first and last display instructions of a selected portion of a display buffer;
 b) a window memory segment containing pointers to display instructions within the display buffer and defining, with respect to the portion of said display buffer defined by said virtual display memory segment, a bounded rectangular area of arbitrary dimension, orientation and position; and
 c) a viewpoint memory segment containing display instructions defining, with respect to the portion of said display buffer defined by said window memory segment, a bounded rectangular area of arbitrary dimension, orientation and position;
and further wherein:
 d) the interface mans is configured to transfer to the application program data form only that portion of the display defined by said viewport memory means;
and further comprising:
 e) means for performing transformations between the portions of said display buffer specified by said window memory segment and the portions of said display buffer defined by said viewport memory segment.

45. The system of claim 44 wherein said transformation means further comprises means for performing transformations between the portion of said display buffer defined by said window memory segment and portions of a second display buffer contained in a second viewport segment associated therewith.

46. The system of claim 44 wherein the display buffer further comprises a plurality of virtual terminal memory segments, each for storing an identifier associated with a viewport memory segment and a priority value, and further wherein the display driver includes means for displaying the rectangular area defined by a first viewport memory segment specified by a first virtual terminal memory segment so as to occlude the display of data specified by at least one other viewport, which other viewport is itself specified by another virtual terminal memory means having associated therewith a priority value lower than that stored in said first virtual terminal memory segment.

47. The system of claim 44 wherein said virtual display memory segment is specified by data comprising;
 a) an identifier;
 b) access mode;
 c) device code;
 d) storage code;
 e) initial values of interior and exterior pixels; and
 f) dimensions.

48. The system of claim 44 wherein said window memory segment is specified by data comprising:
 a) an identifier associated with a virtual display memory segment;
 b) an identifier;
 c) dimensions;
 d) position; and
 e) angular orientation.

49. The system of claim 44 wherein said viewport memory segment is specified by data comprising:
 a) an identifier associated with a virtual display memory segment;
 b) an identifier;
 c) dimensions;
 d) position; and
 e) angular orientation.

50. The system of claim 49 wherein said viewport memory segment further comprises a pointer to a list of identifiers corresponding to hierarchically superior viewport memory segments.

51. The system of claim 49 wherein said viewport memory segment further comprises a pointer to a description of those data in said viewport memory means corresponding to display areas unoccluded by display areas corresponding to hierarchically superior viewport memory segments.

52. The system of claim 1 wherein the memory-partitioning means defines in the system memory an application data buffer in response to a command issued by an application program via the interface means.

53. The system of claim 1 further comprising means for subdividing the display into a plurality of overlapping rectangular display regions, each corresponding to display instructions contained in different display buffers.

54. The system of claim 53 wherein the overlap among rectangular display regions is determined by hierarchical specifications included in each application data buffer.

55. The system of claim 1 wherein the dimensions of a display are defined in terms of x and y coordinates.

56. The system of claim 1 further comprising processor means for integrating data from a plurality of display buffers into a single display list by means of a specified mapping procedure.

57. The system of claim 56 wherein the mapping procedure comprises point-by-point logic operations.

58. The system of claim 57 wherein the logic operations are selected from the group consisting of AND, NAND, OR, XOR, NOR and COMPLEMENT.

59. The system of claim 56 wherein the mapping procedure comprises point-by-point arithmetic operations.

* * * * *